(12) United States Patent
King-Smith

(10) Patent No.: US 6,697,608 B2
(45) Date of Patent: Feb. 24, 2004

(54) DIGITAL AUDIO/VISUAL RECEIVER WITH RECORDABLE MEMORY

(75) Inventor: Anthony David King-Smith, Twickenham (GB)

(73) Assignee: Matsushita Electric Industrial Co., Ltd., Osaka (JP)

( * ) Notice: Subject to any disclaimer, the term of this patent is extended or adjusted under 35 U.S.C. 154(b) by 22 days.

(21) Appl. No.: 09/982,089

(22) Filed: Oct. 19, 2001

(65) Prior Publication Data

US 2002/0055331 A1 May 9, 2002

(30) Foreign Application Priority Data

Oct. 20, 2000 (EP) .............................................. 00309269

(51) Int. Cl.[7] .................................................. H04B 1/18
(52) U.S. Cl. ...................................... 455/186.1; 455/45
(58) Field of Search ................................ 455/45, 184.1, 455/185.1, 186.1, 186.2, 166.1, 166.2, 161.2, 161.3, 345

(56) References Cited

U.S. PATENT DOCUMENTS

| | | | | |
|---|---|---|---|---|
| 5,408,686 A | * | 4/1995 | Mankovitz | 455/45 |
| 5,584,051 A | * | 12/1996 | Goken | 455/45 |
| 6,021,320 A | * | 2/2000 | Bickford et al. | 455/186.1 |
| 6,240,280 B1 | * | 5/2001 | Ravi et al. | 455/186.1 |

FOREIGN PATENT DOCUMENTS

| | | |
|---|---|---|
| DE | 29803654 U1 | 4/1998 |
| EP | 0537756 A2 | 4/1993 |
| EP | 0989695 A2 | 3/2000 |
| WO | WO 98/03016 | 1/1998 |

* cited by examiner

*Primary Examiner*—Nay Maung
(74) *Attorney, Agent, or Firm*—McDermott, Will & Emery

(57) ABSTRACT

A typical radio receiver (20) for DAB or DVB has recordable memory (33) for selecting broadcast digital information. To simplify retrieval of the information, the selection means (27) is operable to present to the user a sequence of sources of information for reproduction including the memory means as well as the broadcast sources, whereby selection of recorded information is as simple as selection of broadcast information.

10 Claims, 2 Drawing Sheets

DIGITAL AUDIO/VISUAL RECEIVER WITH RECORDABLE MEMORY

The present invention relates to a receiver for receiving and decoding digital broadcast signals.

Next generation broadcast systems such as DAB (Digital Audio Broadcast) and DVB (Digital Video Broadcast) are usually based on providing a fairly simple "core service". This "core service" is to deliver continuous broadcasts of either audio or video programs, which are received by many customers. These customers can select one programme from several being broadcast by using a simple selection process, which is presented to them via a well-understood User Interface. For example, a radio broadcast user expects to select a band (e.g. AM or FM) then a frequency within that band to receive the program of choice.

DAB delivers continuous broadcast data in a slightly different way for users, but the model is still the same. Users will first select a "multiplex" instead of a band. This multiplex will contain a number of "channels" rather than frequencies, of which the user will choose one. The user will then hear the program of choice.

DVB is similar, in that a user will select a provider (e.g. BskyB) instead of a band. That provider will then send a list of "channels" rather than frequencies, of which the user again chooses one to see the program of choice.

(Multiplexes (DAB) and providers (DVB) are hereinafter collectively referred to as "sources".)

Thus, the "core service" provided by any broadcast system, whether for audio or video (or in principle data) can be operated by the same basic user interface.

However, one of the basic advantages of a digital-based broadcast system is that data can also be sent, which can potentially be stored in the receiver itself. This data can include information related to transmitted programs, programs themselves being transmitted on one or more channels, or a separate data stream that may be creating a quite separate data structure in the receiver, such as a small website.

One major problem with the data stored is providing a simple mechanism to allow the user to interact with it. Most existing systems try to provide a different user interface based on computer-style user interfaces, but this can be both confusing for many users, and expensive because of the additional hardware and software required to operate the data navigation system. An example of this is the use of complex Electronic Program Guides (commonly known as EPGs). These usually require far more sophisticated hardware and software than that normally found in consumer products, (e.g. a graphics display if no TV is present; a 32-bit CPU to handle the EPG code), and are usually quite complex for technically-averse users to navigate.

It is an object of the present invention to allow users of a broadcast receiver to interact with stored data in a simplified way, and at a reduced cost to the manufacturer.

The present invention provides a receiver capable of receiving and reproducing broadcast digital information comprising:

a radio frequency (rf) receiver for receiving information from a plurality of sources;

signal processing means connected to the rf receiver for decoding received radio frequency signals, memory means for storing selected broadcast digital information for reproduction after the information has been broadcast, control means for controlling the operations of the signal processing means and the memory means, and a man-machine-interface (MMI) connected to the control means, the man-machine-interface including selection means enabling a user to select information to be reproduced, the selection means being operable to present to the user a sequence of sources of information available for reproduction, the sequence including said memory means as well as the broadcast rf sources; and means for reproducing selected information.

Thus, the user sees the stored data simply as one or more additional "sources" to be selected in exactly the same way as any of the live broadcast sources. These additional "sources" may be regarded as "virtual channels" which may be selected in the same way as live audio or video channels.

Other preferred features of the invention are detailed in the attached subsidiary claims. In the preferred embodiment of the invention means are provided for displaying data for identifying said sources, which is preferably displayed sequentially in response to operation of said selection means. For this, the selection means may comprise a single operating member such as a simple push button or rotatable knob.

Preferably a sub-sequence is associated with each source, which is presented to the user following the selection of a particular source. The selection means may have a separate operating member for selection from the sub-sequence.

The control means preferably controls the storage of information in said memory means and may be controllable in response to received broadcast signals. Thus, the storage of information may be entirely controlled by the broadcaster. The commercial implications and advantages of this are addressed in more detail below.

Usually, the interface between the control means and the memory means uses the same data formats and protocols as the interface between the control means and the signal processing means. Thus, one or other of the memory means and the control means may contain conversion means for converting from one data format to the same format as the other. Alternatively, the control means may incorporate means for standardising data received from the memory means and the signal processing means to a common format for presentation to the MMI. Alternatively, signals may be processed in two or more different formats, provided that the different data is presented to the user in a common format.

An embodiment of the invention will now be described by way of example with reference to the accompanying drawings, in which.

Figure 1:
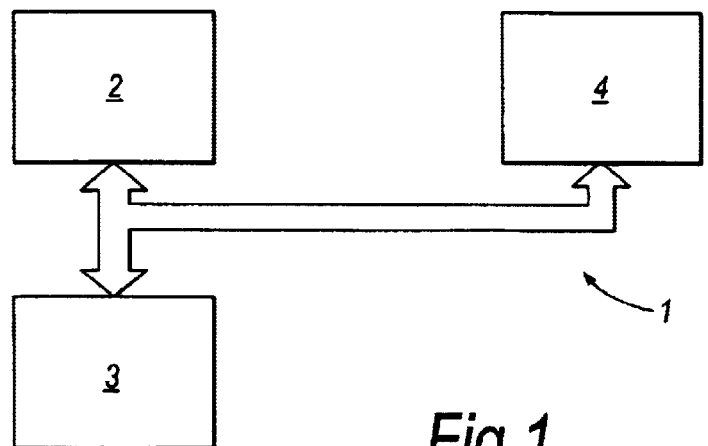
FIG. 1 illustrates schematically the main components of the receiver according to the invention.

The main components of a receiver according to the invention are shown in FIG. 1. As in a conventional digital receiver, the receiver 1 comprises a decoder 2, which receives and decodes a digital signal to generate an output signal, and is controlled by a host controller 3. The received signal may comprise, for example, digital audio or video broadcasts. The detailed functions of the decoder 2 are not illustrated in FIG. 1. The receiver 1 further includes a storage subsystem 4, capable of storing data received by the decoder 2. The storage subsystem includes some form of non-volatile storage media, which might include any kind of conventional media, such as flash ROM, a Secure Digital (SD)-card, DRAM or a Hard Disk Drive or DVD-RAM.

The receiver 1 is controlled by the user via a Man Machine Interface (MMI) (not shown), by means of which the user can select a desired program or service. In implementing the commands of the user, the controller 3 communicates with the decoder 2, which then receives the appropriate digital signal, and extracts and outputs the required information from it, for example as an audio output in the case of DAB.

In the receiver of FIG. 1, the interface between the controller 3 and the storage subsystem 4 may use the same protocols and data formats as the interface between the controller 3 and the decoder 2. This allows information from the storage subsystem, such as identities and details of stored programs, to be automatically presented to the user via the controller and MMI in the same style and format as information received from the decoder. For example, information regarding live broadcasts received by the decoder will be presented to the user in the same way as information regarding programs previously recorded and stored in the storage subsystem. Alternatively, however, different formats or protocols may be used in the respective interfaces of the controller 3 with the storage subsystem 4 and the decoder 2.

Similarly, the commands of the user, for example instructions relating to the selection of a program or service, are relayed via the MMI and controller in the same format whether they are directed to the decoder or the storage subsystem. This allows the user to interact with or select stored data and contemporaneously received data in the same way. For example, the user need not distinguish between a live broadcast and a previously stored program, but can instead control the receiver in an identical manner irrespective of the source of the selected program.

Figure 2:
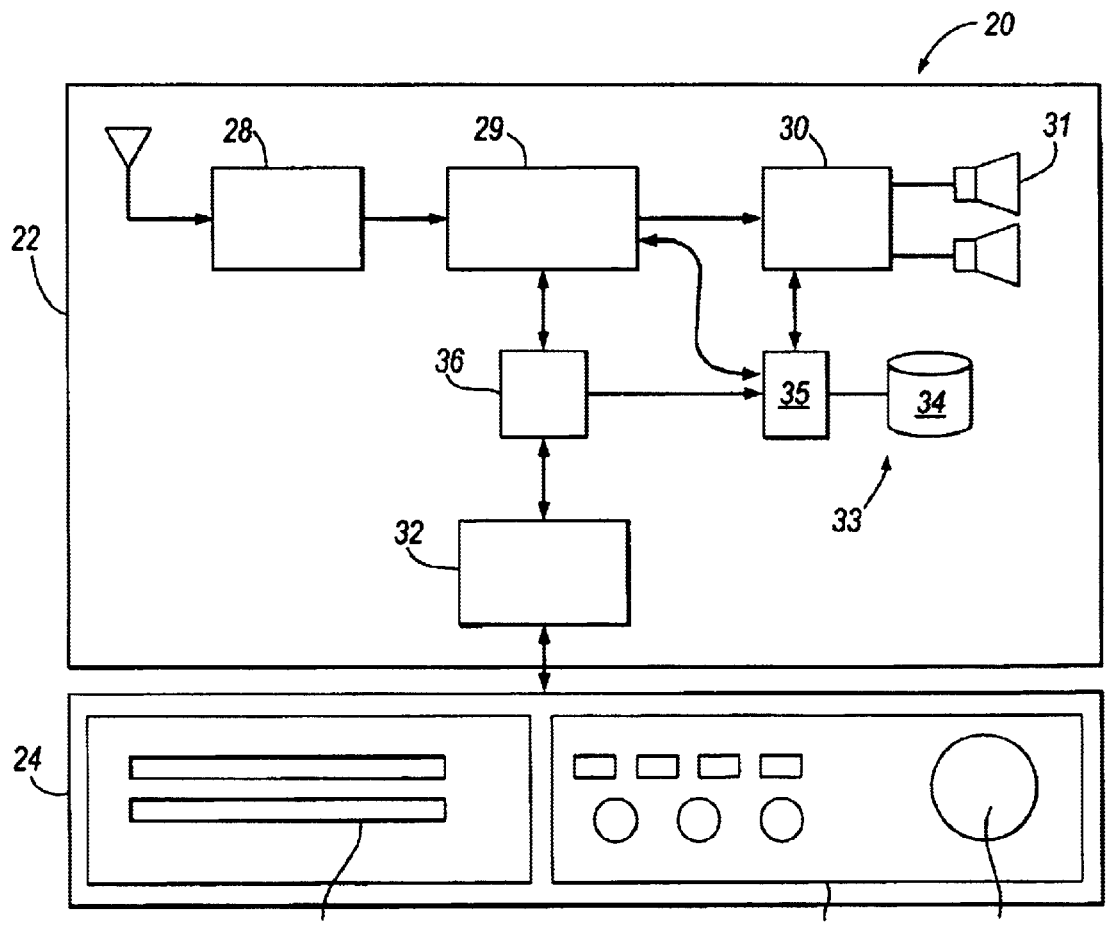
FIG. 2 is a schematic representation of a digital audio receiver in accordance with a preferred embodiment of the invention.

A preferred embodiment of the invention in the form of a Digital Audio receiver is shown in more detail in FIG. 2. The receiver 20 comprises receiver circuitry 22 and a Man Machine Interface 24. The MMI 24 is divided into a receiver display 25 and various receiver controls 26. The display provides the user with information about available audio programs, and can also supply program-related messages specific to the selected program. The receiver shown in FIG. 2 has a typical two row display, in which the upper row shows the name of each multiplex in turn during tuning, and then changes to display the name of the selected station in response to the user making a selection. The lower row of the display shows current messages associated with the selected station, for example the name of the current program, song titles, etc.

The receiver controls 26 are identical to those of a conventional DAB receiver. A multiplex/station selector 27 allows the user first to select a multiplex, and then to select a subchannel or station with the selected multiplex. For example, the selector 27 may comprise an inner knob for selecting the multiplex, and an outer ring for selecting the station.

The receiver circuitry 22 comprises a conventional RF front end 28 connected to a DAB baseband signal processor 29, which decodes the received signal and supplies an output signal to a conventional receiver output unit 30, which may comprise, for example, two 16-bit audio digital-to-analogue convertors. The output unit then supplies a stereo output signal to loudspeakers 31. The baseband processor 29 is controlled by a host or controller CPU 32, in response to user inputs received via the MMI 24.

The circuitry further comprises a digital broadcast storage subsystem (DBSS) 33, which in this embodiment consists of a hard disk drive 34 and associated controller 35. As explained in connection with FIG. 1, the storage subsystem may include any kind of storage media. The storage subsystem is connected to an input of the baseband processor 29, in order to allow the processing and audio output of stored audio data. As shown in the embodiment of FIG. 2, the storage subsystem 33 may also be connected directly to the receiver output unit 30, such that a raw data stream may be fed directly to the output unit. The operation of the storage subsystem is controlled by a DBSS controller 36, which is connected between the controller CPU 32 and the baseband processor 29, and is also connected to the disk drive controller 35. The DBSS controller allows the controller CPU 32 to communicate with the baseband processor 29 when required, but can also intercept signals between the controller CPU and the baseband processor when necessary for the use of the storage subsystem. This means that it is possible to use a conventional DAB baseband processor and/or controller CPU together with the storage subsystem and DBSS controller, without the baseband processor or controller CPU necessarily being adapted for use with a storage system. In other words, the storage subsystem and DBSS controller may be added to a conventional DAB receiver.

When using the DAB receiver of FIG. 2, the user can select live broadcasts in the same way as with a conventional DAB receiver, by using the multiplex/station selector 27 to cycle through available multiplexes and select a desired station within the selected multiplex. However, through the inclusion of the storage subsystem 33 and DBSS controller 36, the receiver 20 is able to store digital audio data and other related program data, and to play back stored audio data through the output unit 30.

In order to store an audio program for playback at a later time, the baseband receiver receives instructions from the controller CPU in a conventional manner, to extract the required information from a particular digital signal. The DBSS controller then communicates with the baseband processor to ensure that the received data is delivered to the storage subsystem and, if desired, not to the audio output unit 30. The method for delivering the data to the storage subsystem is dependent on the broadcast system used. In DAB, for example, MOT or Packet Mode data formats could be used. However, DAB transmissions may be stored in their original MP2 form, or possibly in other transcoded forms. For some applications it may be desirable to store an entire multiplex including, for example, several radio stations simultaneously. In short, data may be stored in any desired format or in the form it takes at any stage of the transmission or decoding process.

The form in which the data is stored in the storage subsystem is structured in such a way that it can be accessed using the same MMI as if it were another live broadcast. For example, in a conventional DAB receiver, the user selects a multiplex, then a subchannel within that multiplex to listen to an individual program. In a preferred embodiment of the invention, if the user wishes to store a program on the receiver for playback at a later time, the storage subsystem will take the data and place it in a file which is located in a directory structure on the disk. For example, the directory for this file may be "BBC Radio 4 News", and the individual file could be identified by the date and time it was originally transmitted.

In order for the user to access this stored data, it is not necessary to use a separate interface from that used to select live broadcasts. Instead, when the user turns the multiplex selector dial 27 of the DAB receiver, they will first see all of the live multiplexes (e.g. "11B Digital One", "12B BBC National"). If they continue to turn the dial, the controller CPU 32 controlling the DAB baseband processor 29 will receive the information from the baseband processor that there are no more live multiplexes being received. In response to this information, instead of communicating to the MMI that no more multiplexes are available or scrolling back to the first displayed multiplex, the controller CPU will look to the storage subsystem and look for any directories that are present there. If there are directories of stored programs present in the storage subsystem, the CPU will then send the directory information back to the MMI as if it had found another live broadcast multiplex. Thus, if a directory called "BBC Radio 4 News" was found, then in response to the user turning the multiplex selector dial, the MMI would display "11B Digital One" then "12B BBC National", followed by "INT BBC Radio 4 News", where "INT" is a symbol inserted by the controller CPU to indicate this program has come from an internal source rather than a live broadcast. The user is free to select any of the available live multiplexes or stored directories simply by using the multiplex selector dial in the conventional manner.

With the multiplex selector dial in a given position, the user then selects a subchannel from within the multiplex. If the user had initially selected the BBC multiplex, for example, a list of channels would appear such as "Radio 1" followed by "Radio 2" then "Radio 3" and so on. However, if the "INT BBC Radio 4 News" multiplex was selected, a series of file names would appear which show the dates and times when each of the stored files were received. The user can then select any of the individual files in the same way as they would conventionally select a channel within a multiplex. As soon as the user chooses the desired file, it starts to play. By these means, the user can interact with stored files in the same familiar way as with live broadcasts and, in certain applications, need not be aware of the distinction between the two sources.

Figure 3:
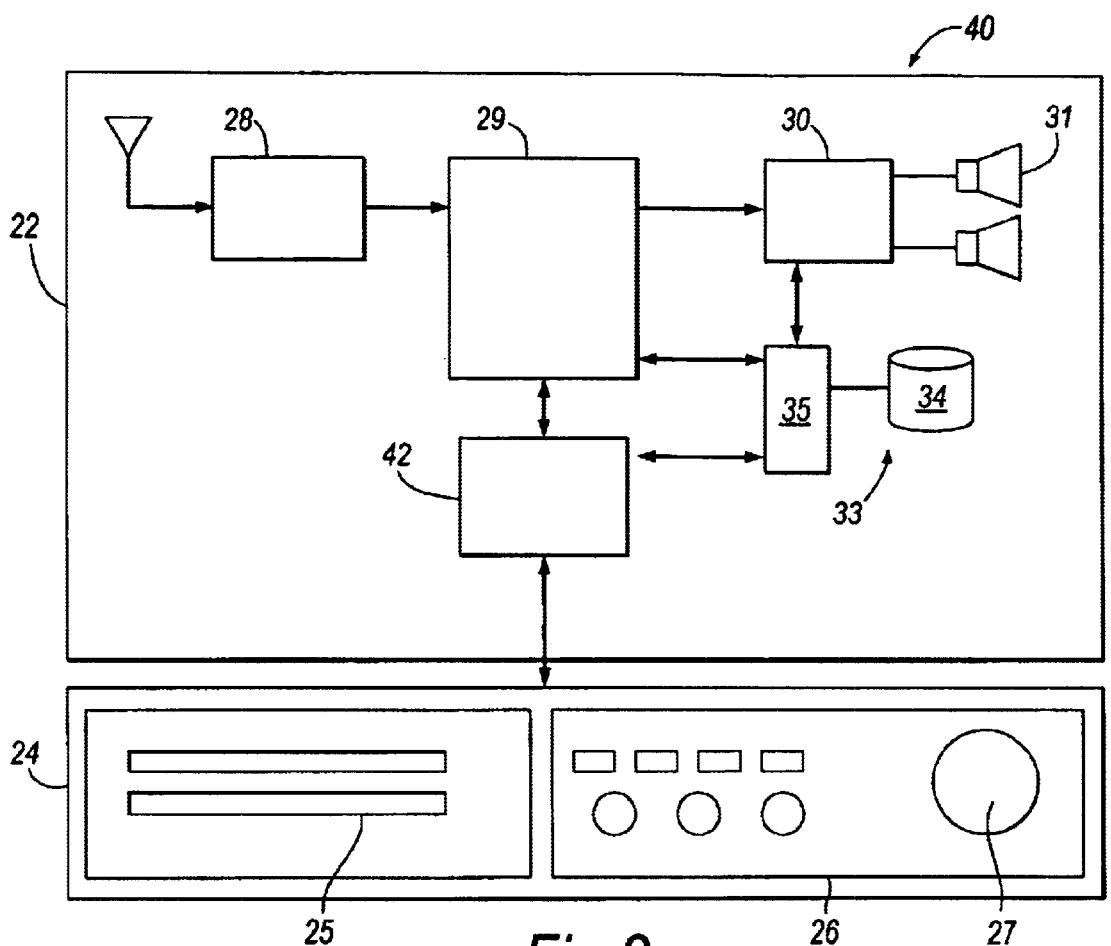
FIG. 3 is a schematic representation of a digital audio receiver in accordance with a further embodiment.

As described previously, the embodiment of FIG. 2 is suitable for implementation using a conventional DAB receiver, modified through the addition of a digital broadcast storage subsystem and a corresponding DBSS controller. The DBSS controller can be included by breaking the link between the CPU and the baseband processor in the conventional receiver and inserting the DBSS controller between these two components. The baseband processor in a conventional DAB receiver may already include a spare input through which the storage subsystem may be connected to it.

Where the receiver is designed specifically to incorporate a storage subsystem, the circuitry may be simplified as shown in FIG. 3. In FIG. 3, all of the components except for the controller CPU are identical to those of FIG. 2, and are given identical reference numerals. In this embodiment, there is no separate DBSS controller, and the controller CPU 42 is connected directly to both the baseband processor 29 and the storage subsystem 33. As shown in FIG. 3, and described in connection with FIG. 2, the storage subsystem 33 may optionally also be connected directly to the receiver output unit 30. Alternatively or additionally, the storage subsystem could be connected to a separate output, for example receiver "line out" connectors, or to a digital receiver output via an interface such as USB or P1394.

The controller CPU 42 effectively carries out the functions of the DBSS controller of FIG. 2, as well as controlling the baseband processor 29. However, since the CPU 42 is designed specifically for this purpose, its operation may be simplified in comparison with the separate controller CPU and DBSS controller of FIG. 2, in order that it can interact efficiently with the baseband processor 29 and the storage subsystem 33 in the manner required for this application.

The receiver of FIG. 3 is operated by the user in exactly the same way as the receiver shown in FIG. 2. However, since the controller CPU is connected directly to both the baseband processor 29 and the storage subsystem 33, the controller CPU can communicate directly with the processor 29 in order to determine whether any more live multiplexes are available, in response to the user scrolling through the list of multiplexes. In the event that no more multiplexes are available, the controller CPU can then interrogate the storage subsystem directly, in order to check for available stored programs. In response to the user selecting a desired program from either a live broadcast or the storage subsystem, the controller CPU will arrange for the chosen program to be delivered to the audio output, and for any appropriate program information to be displayed to the user.

Figure 4:
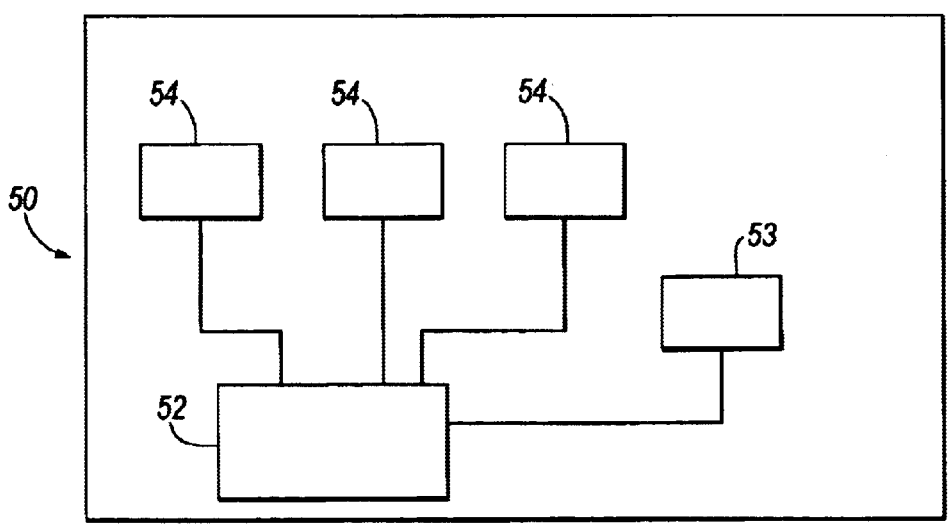
FIG. 4 shows a multi-function receiver in accordance with a further embodiment.

An advantage of the embodiment of FIG. 2 is that it may be implemented using a conventional DAB receiver, which need only be modified in certain respects, as described above. However, where a controller CPU is used which is designed specifically for this purpose, as in the embodiment of FIG. 3, the functions of the receiver can be extended to include more sources of data, which can all be presented to and controlled by the user in the same way. FIG. 4 shows schematically a multi-function receiver 50 comprising a host controller 52 connected to a digital broadcast storage subsystem 53 and a plurality of decoders 54. As in the embodiment of FIG. 3, the host controller allows the user to interact with stored programs in the same way as with live broadcasts, by presenting information to the user in a consistent manner and communicating with the appropriate source (i.e. the appropriate decoder or storage subsystem) in response to a given user instruction. For example, the user may scroll through a list of available multiplexes or channels without being aware of the source of a given multiplex name presented to them on the receiver display, whereas the controller may be obtaining the relevant information from a number of different decoders as well as the storage subsystem.

In the embodiments described above, it will be noted that the MMI first communicates information about available multiplexes, and then allows the user to select the desired services or channels. This is the nature of the control interface in a conventional DAB receiver. However, it is also possible for the receiver simply to present the user with a series of channels, including stored data or "virtual channels", and effectively hide the multiplex information from the user. The available channels may then be presented in any suitable order, such as alphabetically, grouped by type, or grouped by individual usage.

The decoders may be DAB, DVB, ADSL decoders or any such data source, or any combination of these. For example, it may be desirable to have more than one decoder of a given type in order to be able to store a program from one multiplex while listening to or watching a program from a different multiplex.

It is convenient if data is stored in the storage subsystem in the same format used by the decoder or decoders in the receiver, in order that the data can easily be transferred between these different components. However, this is not always possible, for example where a number of decoders of different kinds are provided (e.g. DAB and DVB) and it is desired to use a single storage subsystem utilising a single data format. In such cases, transcoders may be provided, for example within the storage subsystem, to convert the data format between the different components of the system where required. For example, a conventional DAB receiver would use an MP2 decoder, and so it may be desirable for a modified receiver according to the invention to use a storage subsystem using the MP2 format. However, it may be desirable for the receiver to be provided with an output in order that stored programs may be transferred to other devices. Such an output may ideally provide data in MP3, AAC or PCM formats, which are common to portable devices for storing and playing digital music data. In this case, therefore, a transcoder could be provided to enable stored MP2 data to be transferred to the output in the required different format.

It may also be convenient for connections and appropriate transcoders to be provided to allow data to be transferred between different decoders. For example, in the embodiment of FIG. 4, two of the decoders 54 may be a DAB decoder and a DVB decoder respectively. It is possible that certain audio radio broadcasts are not transmitted by broadcasters amongst the available DAB transmissions, but that these audio broadcasts could be included in a DVB transmission. Such a transmission could be received by the DVB decoder in the DVB format, but subsequently transferred via an appropriate transcoder (not shown) to the DAB decoder. Using such an arrangement, the audio broadcast could then be selected by the host controller 52 from the DAB decoder in the same way as any other DAB broadcast. The user would therefore simply have access to additional audio programs in the conventional manner, irrespective of the original source and format of the data.

A preferred advantage of the invention lies in the fact that because the user interacts with live broadcasts and stored data in the same way, the user need not be aware of whether a program or other service is being received 'live' or whether it is being replayed from the storage medium. For example, whilst in a simple embodiment the user may choose to record certain radio programs in a DAB system for playback at a later time, it is also possible that the broadcaster could have some control over which data should be stored. An example of this might be that the broadcaster could determine that the user's receiver always has the last five transmitted news programs available in storage. A further example might be that the broadcaster could control the storage in the user's receiver of advertisers' details, such as contact information and telephone numbers, in order that the user could access these details at a later time and would not have to write down or remember such information as it is broadcast.

It is also possible that, where a user has chosen to store a particular program, further information transmitted by the broadcaster can be taken into account in the process of transferring the program data to the storage subsystem. For example, the receiver could record the desired program even if the time of the broadcast is changed, by identifying the actual start of the program in accordance with appropriate data transmitted by the broadcaster together with the program itself. This will assist in enabling the user to select the beginning of the stored program when it is replayed at a later time.

It is also possible for the user to interact with a mixture of stored and live data. For example, the storage subsystem may be implemented as a first-in first-out (FIFO) storage system which can be used as a buffer to store the contents of a live broadcast for a given period after it is received. This may enable the user to access a live broadcast initially, but to use the buffer of stored data to replay a recent portion of the program, if desired, at any time while the relevant portion of program data is still in the buffer.

In the foregoing description, the operation of a receiver according to the invention has been described with reference to the selection of a multiplex or source (except where the multiplex is "hidden" from the user), and the subsequent selection of a service or channel within the selected multiplex or source. However, it will be appreciated that there may be more than these two levels of hierarchy involved in the selection of a desired digital service or channel. For example, using DAB there may be an extra level of hierarchy due to the availability of secondary channels.

What is claimed is:

1. A receiver capable of receiving and reproducing broadcast digital information comprising:

a radio frequency (rf) receiver for receiving information from a plurality of sources;

signal processing means connected to the rf receiver for decoding received radio frequency signals, memory means for storing selected broadcast digital information for reproduction after the information has been broadcast, control means for controlling the operations of the signal processing means and the memory means, and a man-machine-interface (MMI) connected to the control means, the man-machine-interface including selection means enabling a user to select information to be reproduced, the selection means being operable to present to the user a sequence of sources of information available for reproduction, the sequence including said memory means as well as the broadcast rf sources; and means for reproducing selected information.

2. A receiver as claimed in claim 1 in which said memory means is divided into a plurality of directories each of which comprises a separate source in said sequence.

3. A receiver as claimed in claim 1 including means for displaying data identifying said sources.

4. A receiver as claimed in claim 3 in which said source identifying data is displayed sequentially in response to operation of said selection means.

5. A receiver as claimed in claim 1 in which a sub-sequence is associated with each source, the sub-sequence being presented to the user following the selection of a particular source.

6. A receiver as claimed in claim 1 in which the control means controls the storage of information in said memory means and is controllable in response to received broadcast signals.

7. A receiver as claimed in claim 1 in which the interface between the control means and the memory means uses the same data formats and protocols as the interface between the control means and the signal processing means.

8. A receiver as claimed in claim 1 in which the signal processing means includes a plurality of discrete decoders.

9. A receiver as claimed in claim 8 including decoders for at least two different broadcast data formats.

10. A receiver as claimed in claim 1 in which said memory means includes means for storing data in a plurality of different formats.

* * * * *